United States Patent
Lindo (10) Patent No.: US 10,275,801 B2
(45) Date of Patent: Apr. 30, 2019

(54) ADAPTING USER TERMINAL ADVERTISEMENTS RESPONSIVE TO MEASURED USER BEHAVIOR

(71) Applicant: CA, INC., New York, NY (US)

(72) Inventor: Jonathan Lindo, Emerald Hills, CA (US)

(73) Assignee: CA, INC., New York, NY (US)

( * ) Notice: Subject to any disclaimer, the term of this patent is extended or adjusted under 35 U.S.C. 154(b) by 870 days.

(21) Appl. No.: 14/576,965

(22) Filed: Dec. 19, 2014

(65) Prior Publication Data

US 2016/0180399 A1  Jun. 23, 2016

(51) Int. Cl.
  *G06Q 30/00* (2012.01)
  *G06Q 30/02* (2012.01)

(52) U.S. Cl.
  CPC ............. *G06Q 30/0269* (2013.01)

(58) Field of Classification Search
  USPC ............. 705/14.45; 455/414.1; 345/156
  See application file for complete search history.

(56) References Cited

U.S. PATENT DOCUMENTS

| | | | | |
|---|---|---|---|---|
| 9,336,481 | B1* | 5/2016 | Ionson | G06N 5/04 |
| 2008/0214156 | A1* | 9/2008 | Ramer | G06F 17/30749 |
| | | | | 455/414.1 |
| 2009/0228426 | A1* | 9/2009 | Bonasso | G06N 99/005 |
| | | | | 706/60 |
| 2009/0273559 | A1* | 11/2009 | Rofougaran | A63F 13/235 |
| | | | | 345/156 |
| 2013/0291065 | A1* | 10/2013 | Jakowski | G06F 15/16 |
| | | | | 726/4 |
| 2014/0040017 | A1* | 2/2014 | Bafna | G06Q 30/0246 |
| | | | | 705/14.45 |
| 2014/0058801 | A1* | 2/2014 | Deodhar | G06Q 10/0639 |
| | | | | 705/7.38 |
| 2014/0126708 | A1* | 5/2014 | Sayko | H04M 11/00 |
| | | | | 379/93.01 |
| 2014/0126715 | A1* | 5/2014 | Lum | H04M 3/5133 |
| | | | | 379/265.09 |
| 2014/0187342 | A1* | 7/2014 | Brady | A45F 3/04 |
| | | | | 473/288 |
| 2014/0195272 | A1* | 7/2014 | Sadiq | G06Q 40/08 |
| | | | | 705/4 |
| 2014/0228118 | A1* | 8/2014 | Hardy | G06T 19/006 |
| | | | | 463/31 |
| 2014/0274413 | A1* | 9/2014 | Chelst | A63F 13/795 |
| | | | | 463/42 |
| 2014/0315164 | A1* | 10/2014 | Jones | G09B 19/16 |
| | | | | 434/219 |
| 2015/0019352 | A1* | 1/2015 | Flynn | G06Q 30/0277 |
| | | | | 705/14.73 |
| 2015/0127365 | A1* | 5/2015 | Rizvi | G02B 27/017 |
| | | | | 705/2 |
| 2015/0242793 | A1* | 8/2015 | Williams | G06Q 10/06398 |
| | | | | 705/7.42 |

(Continued)

Primary Examiner — Matthew T Sittner
(74) Attorney, Agent, or Firm — Sage Patent Group (57) ABSTRACT

User profile information is generated which characterizes measured user interaction with an application program that is encapsulated by the computer readable program code and processed by the processor. Operation of an advertisement displayed while the application program is being processed is controlled based on the user profile information.

22 Claims, 6 Drawing Sheets

(56) References Cited

U.S. PATENT DOCUMENTS

| | | | |
|---|---|---|---|
| 2015/0262109 A1* | 9/2015 | Ainsworth, III | ................................ G06Q 10/06398 705/7.42 |
| 2015/0278158 A1* | 10/2015 | Singh | ..................... G06Q 50/01 703/2 |
| 2015/0375040 A1* | 12/2015 | Sigal | .................. A63B 24/0059 482/4 |
| 2016/0012559 A1* | 1/2016 | Patterson | ........... G06Q 50/2057 705/328 |
| 2016/0034923 A1* | 2/2016 | Majumdar | .............. G06Q 40/00 705/7.29 |
| 2016/0048643 A1* | 2/2016 | Woods | ................... G16H 10/60 705/3 |
| 2016/0086121 A1* | 3/2016 | Heilbrunn | ........ G06Q 10/06393 705/7.39 |
| 2016/0180399 A1* | 6/2016 | Lindo | ................ G06Q 30/0269 705/14.66 |
| 2016/0232624 A1* | 8/2016 | Goldberg | ................ G06Q 30/02 |
| 2016/0349960 A1* | 12/2016 | Kumar | ................. G06F 3/04817 |
| 2016/0357498 A1* | 12/2016 | Krasadakis | .......... G07F 17/3227 |
| 2016/0379184 A1* | 12/2016 | Smith | .................... G06Q 20/042 705/14.23 |
| 2017/0189814 A1* | 7/2017 | Ventrice | ................... A63F 13/79 |

\* cited by examiner

ADAPTING USER TERMINAL ADVERTISEMENTS RESPONSIVE TO MEASURED USER BEHAVIOR

BACKGROUND

The present disclosure relates to computing systems, and, in particular, to management of user terminals and/or application programs.

Developers of application programs for user terminals have employed two common monetization models. One monetization model has involved selling application programs over the Internet or an application marketplace. The sale requires a user to pay a one-time fee for use or purchase a subscription that activates the application program for a defined term. Another monetization model has involved providing free downloads of application programs to user terminals while selling in-application advertisement opportunities to third-party advertisers. Both monetization models have provided developers with the potential to generate revenue.

However, these monetization models have limitations. For instance, users have traditionally resisted purchasing an application program under a sales-based monetization model due to the up-front cost and/or concern with providing financial information necessary for the purchase. Users have instead gravitated toward application programs that are free to download, even when the fee application programs are inferior quality. However, in-application advertisement provided in free application programs detract from the users' experience and can reduce the frequency and/or duration of use and/or decrease users' application ratings postings. As a result, neither monetization model adequately allows developers to maximize monetization opportunities from application programs.

SUMMARY

Some embodiments of the present disclosure are directed to a computer program product that includes a non-transitory computer readable storage medium including computer readable program code embodied in the medium that when executed by a processor of a user terminal causes the processor to perform operations including generating user profile information characterizing measured user interaction with an application program that is encapsulated by the computer readable program code and processed by the processor. Operation of an advertisement displayed while the application program is being processed is controlled based on the user profile information.

Some other embodiments of the present disclosure are directed to a computer program product that includes a non-transitory computer readable storage medium including computer readable program code embodied in the medium that when executed by a processor of an advertisement campaign computer causes the processor to perform operations including receiving user profile information from a user terminal characterizing measured user interaction with an application program processed by the user terminal. A marketing campaign of advertisements displayed by the user terminal is controlled based on the user profile information.

Other methods, systems, and/or computer program products according to embodiments of the inventive subject matter will be or become apparent to one with skill in the art upon review of the following drawings and detailed description. It is intended that all such additional methods, systems, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Over a billion Apple IOS user terminals and Android user terminals are presently being used throughout the world. These user terminals connect through data networks (e.g., Internet) to application servers to download application programs for processing.

As explained above, advertisements provided in free or reduced-cost application programs detract from the users' experience and can reduce the frequency and/or duration of use and/or decrease users' application ratings postings. Increasing the frequency and duration of application use provides more opportunities for monetization from in-application advertisements and increased application ratings which can increase the number of users.

Various embodiments of the present disclosure are directed to customizing advertisements displayed within a same window as information generation by an application program or which are displayed separately from the window used by the application program, based on how a user is observed using the application program. Operational events are collected while the user interacts with the application program and analyzed to characterize the user's behavior and operational use of the application program. The user's application interests and dislikes can be determined, and the user's age, gender, or other demographics may be estimated. This information can be used to customize the types of advertisements, format of advertisements, and/or timing of advertisements provided to that user. The information may furthermore be used to control higher-level marketing campaigns directed to that particular user.

Figure 1:
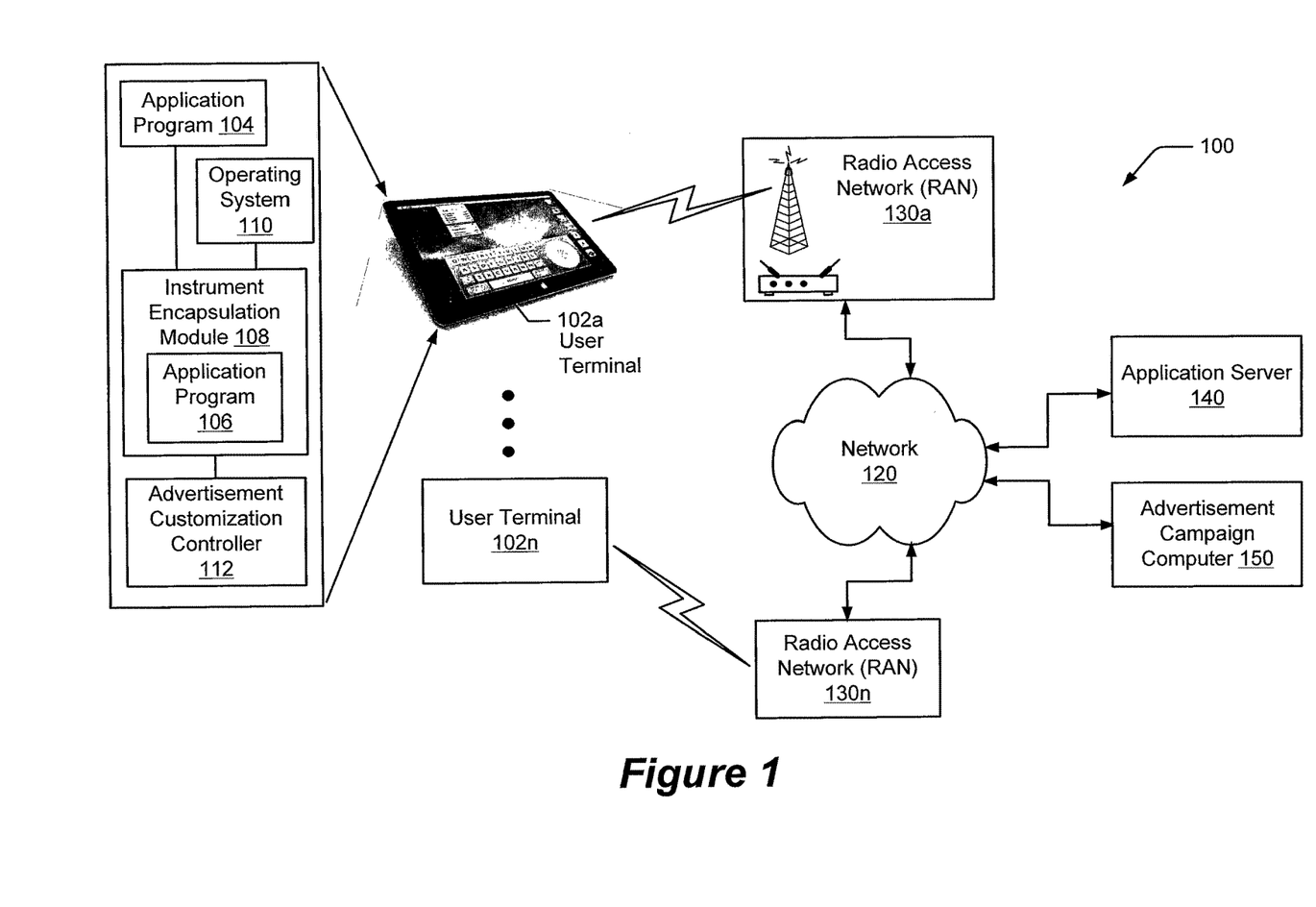
FIG. 1 is a block diagram of a system for controlling operation of an advertisement displayed on a user terminal responsive to measuring user interaction with an application program using an instrument encapsulation module which encapsulates the application program, in accordance with some embodiments of the present disclosure.

FIG. 1 is a block diagram of a system 100 for measuring users' behavior while interacting with an application program 106 processed by user terminals 102a-102n and customizing the types of advertisements, format of advertisements, and/or timing of advertisements displayed by the application program 106 based on the users' behavior. The users' behavior is measured by an instrument encapsulation module 108 which encapsulates the application program 106 in accordance with some embodiments of the present disclosure. An advertisement customization controller 112 customizes one or more advertisements displayed by the application program 106 based on the users' behavior.

The user terminals 102a-102n communicate through wireless (e.g., radio access networks (RAN) 130a-130n) and/or wired network connections via a data network 120 (e.g., Internet) with an application server 140, and may further communicate with an advertisement campaign computer 150. For example, one or more of the user terminals 102a-102n may communicate through the radio access networks 130a-130n using one or more wireless communication protocols that may include, but are not limited to, LTE, WLAN (IEEE 802.11), WiMax, and/or Bluetooth.

The user terminals 102a-102n can download application programs from the application server 140. The application server 140 may include the Apple application store server (e.g., iTunes) and/or one or more of the Android application store server (e.g., Google Play and/or Amazon Appstore). The application programs can include, without limitation, gaming programs, spreadsheet programs, multimedia programs, word processing programs, database programs, presentation programs, etc.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein.

Each of the user terminals 102a-102n include an instrument encapsulation module 108 and an advertisement customization controller 112. The instrument encapsulation module 108 operates to generate user profile information characterizing a user's interaction with the application program 106 encapsulated by the instrument encapsulation module 108 and processed by a processor of the user terminal 102. The instrument encapsulation module 108 may "wrap around" the application program 106 to intercept or otherwise observe application programming interface (API) calls from the application program 106 to other application programs 104 processed by the user terminal 102, user input interfaces (e.g., touch screen, microphone, camera, volume settings buttons, keypad/keyboard, etc), an operating system 110 processed by the user terminal 102, and/or other software/hardware resources of the user terminal 102.

As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

The advertisement customization controller 112 operates based on the user profile information to control the types of advertisements, format of advertisements, and/or timing of advertisements provided to that user through the user terminal 102, such as through the application program 106.

The instrument encapsulation module 108 may communicate the user profile information to the advertisement campaign computer 150 which operates to control higher-level marketing campaigns directed to the user of the application program 106. The advertisement campaign computer 150 may use the user profile information to select among different types of advertisements that are provided to the user terminal 102 for display, control the format of advertisements that are provided to the user terminal 102 for display, and/or control timing of when advertisements that are provided to the user terminal 102 for display.

Although the advertisement campaign computer 150 has been illustrated as being separate from the application server 140, some or all of the functionality of the advertisement campaign computer 150 may be combined with the application server 140.

The instrument encapsulation module 108 generates user profile information characterizing a user's interaction with the application program 106 based on measurements of the user's interaction with the application program 106. The types of measurements that can be performed by the instrument encapsulation module 108 for generating user profile information may include any one or more of the following:

1. whether displayed advertisements are present/absent during user's use of a feature of the application program 106 and any perceived affect on user's interaction with the application program 106;
2. change in user responsiveness to repetitively occurring input opportunities during operation of the application program 106 between a time before display of the advertisement and a time during display of the advertisement;
3. change in duration of user's use of the application program 106 while advertisements are not displayed compared to duration of user's use of the application program 106 while advertisements are displayed;
4. elapsed time between display of a defined type of advertisement(s), size of advertisement(s), and/or location of advertisement(s) and the user ceasing to use the application program 106;
5. characteristics of advertisements displayed during user's use of a feature of the application program 106 and any perceived affect on user's behavior while using the application program 106 (e.g., changes in user responsiveness to game play, etc.);
6. characteristics of advertisements selected by a user while using the application program 106;
7. a level of user repetitive interaction with the application program 106;
8. whether the user selects advertisements while using application programs and, if so, what type of application program(s);
9. digital picture and/or digital video of user via camera of user terminal 102 responsive to an advertisement being displayed and/or responsive to a user interacting with the advertisement (e.g., selecting an embedded advertisement link);
10. duration of operational use of the application program 106 by the user;

11. time between instances of application program 106 use;
12. time of day and/or day or week of instances of application program 106 use;
13. control gestures or other inputs provided by a user as input to control application program 106 operation;
14. which features and/or sequences of features of the application program 106 are used;
15. how often features and/or sequences of features of the application program 106 are used;
16. responsiveness of a user to provide an input to control application program 106 operation, such as user input responsiveness to prompts generated by the application program 106;
17. digital voice sample of user via microphone of user terminal 102 while using the application program 106;
18. digital picture and/or digital video of user via camera of user terminal 102 while using the application program 106;
19. operational settings selected by the user for operation of the application program 106 and/or changes over time in the user selected operational settings (e.g., skills level settings, speed settings, etc.);
20. gaming challenges or levels selected in an instance by the user from among available challenges/levels;
21. number of features or levels of features of the application program 106 accessed or completed by a user;
22. number of unsuccessful attempts by the user to complete a feature of the application program 106 before ceasing playing;
23. events characterizing inefficient or ineffective operational use of the application program 106 (e.g., appearing navigationally lost within an application program user interface, such as within a game environment);
24. operations that occurred proximate in time to when the user shuts-down the application program 106;
25. whether a user typically uses headphones while using the application program 106;
26. volume setting typically set by user while using the application program 106;
27. user selection of additional in-application features (e.g., download/activate);
28. user selection of other application programs (e.g., download/activate) while using the application program 106;
29. identification and/or characterization of the data communications between the application program 106 interfacing and another application program, an operating system 110, and/or to other software/hardware resources of the user terminal; and
30. other application programs active in background while user is using the application program 106.

The instrument encapsulation module 108 may also generate the user profile information based on measurements of one or more of the following:
1. hardware resource utilization (e.g., application program 106 utilization of user terminal processor resources, application program 106 utilization of user terminal memory resources, rate of information displayed by the application program 106 on a display device of the user terminal 102, application program 106 utilization of user terminal 102 network interface resources, etc.);
2. characteristics of the user terminal 102 processing the application program 106 (e.g., display resolution, speaker volume capability, screen refresh rate capability, manufacturer, operating system information, web browser information, etc.);
3. identifier of the user terminal 102 (e.g., network address, phone number, mobile ID, etc.)
4. mobile application information display update rate;
5. communication latency through the data network 120 and/or the radio access network 130 while processing the application program 106;
6. communication latency between the application program 106 and the application program 104;
7. application program 106 preferred and/or user-defined information display update rate;
8. screen shots captured from a user terminal 102 display or sub-window associated with the application program 106;
9. screen shot captured from a user terminal 102 display or sub-window associated with the application program 106 responsive to an advertisement being displayed;
10. video captured from user terminal 102 display or sub-window associated with the application program 106;
11. video captured from user terminal 102 display or sub-window associated with the application program 106 responsive to an advertisement being displayed;
12. geographic region of the user terminal 102 while the application program 106 is being processed;
13. velocity of the user terminal 102 while processing the application program 106; and
14. events indicative of errors or undesirable operation of the application program 106; and
15. occurrence of one or more defined control gestures performed by the user through a user interface of the user terminal 102 to interface with the application program 106 and/or frequency of occurrence of the one or more defined control gestures.

The instrument encapsulation module 108 may measure the user's interaction with the application program 106 by intercepting and analyzing API calls by the application program 106 to the other application program 104, the operating system 110, and/or a user interface of the user terminal 102.

The instrument encapsulation module 108 analyzes the measurements of the user's interaction to characterize the user's behavior and operational use of the mobile application to generate the user profile information used by the advertisement customization controller 112 and the advertisement campaign computer 150. The user profile information may be generated to characterize any one or more of the following:
1. a level of expertise or familiarity of the user with operating the application program 106;
2. persistence of the user to using operational features or solving challenges (e.g., gaming) provided by operation of the application program 106;
3. types of operational features or operational challenges that are desirable and/or undesirable to the user by operation of the application program 106;
4. user's use of fast paced games vs. slow paced games;
5. user's use of visually complex display features available from the application program 106 (e.g., near-field vision issues);
6. user's use of new operational features available from the application program 106;
7. user's tolerance for in-application advertisements while using the application program 106;
8. user's tolerance for various types of in-application features while using the application program 106;
9. estimation of age, gender, and/or another characteristic of the user based on a digital voice sample of the user via microphone, and prediction of user preferences for using the application program 106 based thereon;

10. estimation the effect on the user's positive perception of the application program 106 by in-application advertisements displayed during user's use of the application program 106;

11. estimating affect on user's ability to operate the application program 106 while in-application advertisements are displayed during user's use of the application program 106; and 12. estimation of age, gender, and/or another characteristic of the user based on picture/video of user via camera, and prediction of user preferences for using the application program 106 based thereon.

The advertisement customization controller 112 operates based on the user profile information to control the types of advertisements, format of advertisements, and/or timing of advertisements provided to that user through the user terminal 102, such as through the application program 106. The advertisement customization controller 112 may control any one or more of the following based on the user profile information:

1. select an advertisement from among different available types (e.g., types of products, types of services, etc.) of advertisements for display by user terminal 102;

2. determine a preferable price range associated with advertised goods/services;

3. control whether an advertisement is displayed within a same window as information displayed by the application program 106 on a display device or displayed within a different window;

4. control a size of text displayed or other format for an advertisement;

5. control a rate at which text or other graphical indicia of an advertisement is scrolled within a display window;

6. control a volume level of an audio portion of an advertisement;

7. control a relative volume level of an audio portion of an advertisement compared to a present volume level setting for other audio from the user terminal 102;

8. control a duration of an advertisement;

9. control the timing of an advertisement displayed by the application program 106, such as how frequently advertisements are displayed, whether advertisement is displayed responsive to start-up of the application program 106, during the user's use of the application program 106, and/or prior to shut-down of the application program 106;

10. control timing of appearance and/or duration of advertisement based on measured level of present user interaction with the application program 106;

11. control timing of appearance and/or duration of advertisement to prediction of user's ability to multitask between viewing advertisement and using the application program 106 and/or based on the user's measured behavior respective to a particular upcoming feature of the application program 106;

12. control whether advertisements are displayed as static images or video;

13. control change rate of video static images for one or more advertisement(s);

14. control frame rate of a video advertisement; and 15. display larger more easily observable indicia or smaller more ornamental indicia within advertisements.

By way of nonlimiting examples, the advertisement customization module 112 responds to the user profile information indicating that a user has less than a threshold interest or tolerance for in-application advertisements while using the application program 106 by displaying text-based advertisements which do not include pictures, and/or displaying advertisements responsive to start-up and/or responsive to shut-down processing of the application program 106 but not while the user is observed using the application program 106. In contrast, the advertisement customization module 112 responds to the user profile information indicating the user has more than a threshold interest or tolerance for in-application advertisements while using the application program 106 by displaying advertisements while the user is observed using the application program 106.

In another embodiment, the advertisement customization module 112 displays an advertisement based on the user exhibiting less than a threshold level of interaction with the application program 106 and ceases displaying an advertisement based on the user exhibiting more than the threshold level of interaction with the application program 106.

In another embodiment, the advertisement customization module 112 displays a video-based advertisement based on the user exhibiting less than a threshold level of interaction with the application program 106, and displays a static image (e.g., text and/or graphical indicia) advertisement based on the user exhibiting more than the threshold level of interaction with the application program 106.

In another embodiment, the advertisement customization module 112 displays an advertisement containing smaller more ornamental indicia based on the user exhibiting less than a threshold level of interaction with the application program 106, and displays an advertisement containing larger more easily observable indicia based on the user exhibiting more than the threshold level of interaction with the application program 106.

In another embodiment, the advertisement customization module 112 controls the application program 106 to decrease an amount of user interaction (e.g., amount of user input via a user interface) required for operation of the application program 106 based on an advertisement being displayed, and to resume the normal user interaction required for operation of the application program 106 based on ceasing display of the advertisement.

In another embodiment, the advertisement customization module 112 controls the application program 106 to decrease a complexity level of the application program 106 (e.g., decrease difficulty level of a game application) based on an advertisement being displayed, and resume the normal complexity level of the application program 106 based on ceasing display of the advertisement.

In this manner advertisements can be customized based on observations of the user's behavior when using the application program. Such customization of advertisements may encourage increased frequency of use, duration of use, and user satisfaction with application programs processed by user terminals.

Figure 2:
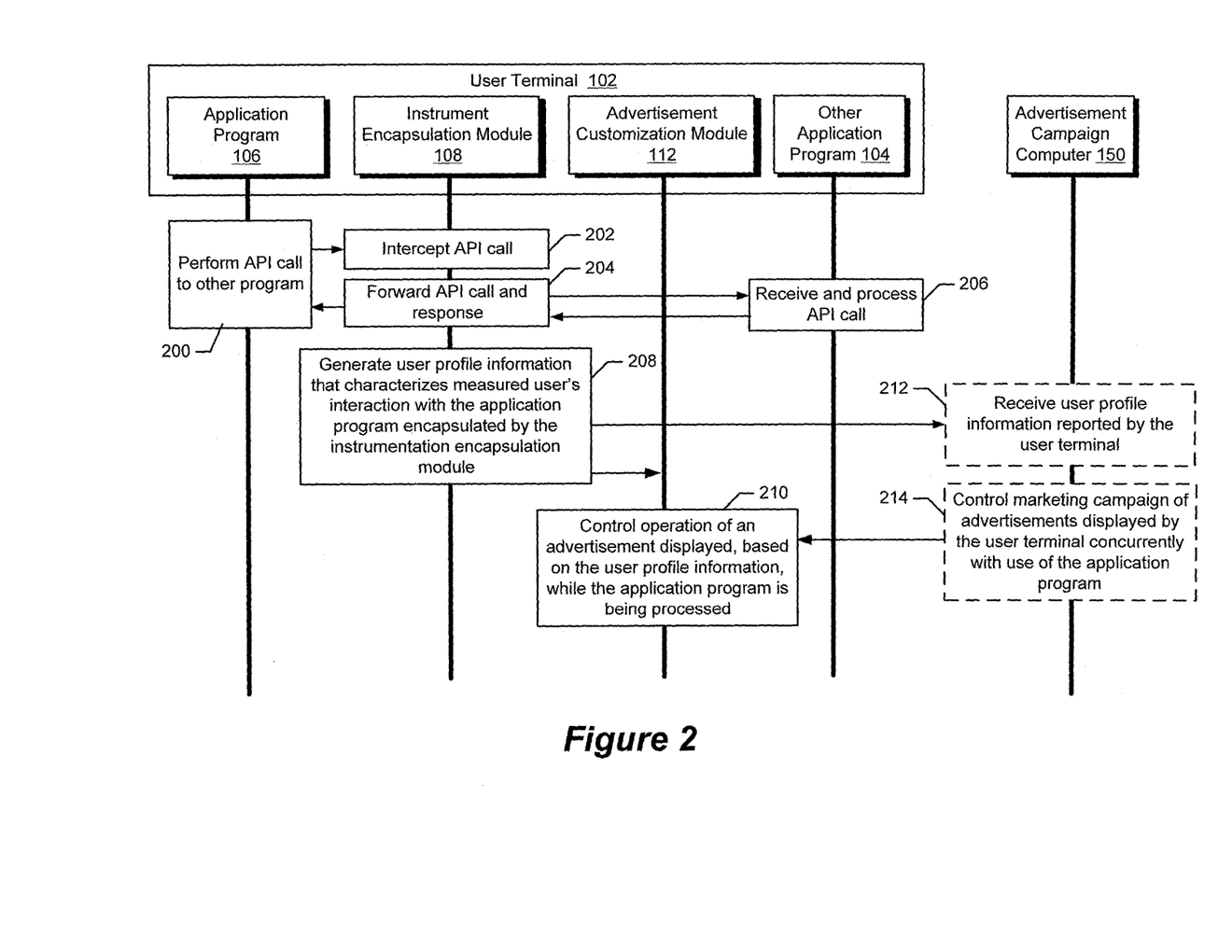
FIG. 2 is a combined data flow diagram and flowchart of operations by a user terminal and an advertisement campaign computer for controlling operation of an advertisement displayed on the user terminal responsive to measuring user interaction with an application program, in accordance with some embodiments of the present disclosure.

FIG. 2 is a combined data flow diagram and flowchart of operations by the user terminal 102 and the advertisement campaign computer 150 for controlling operation of an advertisement displayed on the user terminal 102 responsive to measuring user interaction with the application program 106, in accordance with some embodiments of the present disclosure.

Referring to FIG. 2, the application program 106 performs an API call (block 200) to the other application program 104. The instrument encapsulation module 108 intercepts (block 202) the API call. The instrument encapsulation module 108 forwards (block 204) the API call to the other application program 104, which receives and processes (block 206) the API call. The other application program 104 may communicate a response message which is intercepted and forwarded (block 204) through the instrument encapsulation module 108 to the application program 106.

The instrument encapsulation module 108 generates (block 208) user profile information that characterizes measured user interaction with the application program 106 that is encapsulated by the instrument encapsulation module 108. The advertisement customization module 112 controls (block 210), based on the user profile information, operation of an advertisement displayed while the application program 106 is being processed by a processor of the user terminal 102.

In one embodiment, the instrument encapsulation module 108 communicates the user profile information to the advertisement campaign controller 150. The advertisement campaign controller 150 receives (block 212) the user profile information, and controls (block 214), based on the user profile information, a marketing campaign of advertisements displayed by the user terminal 102. For example, the advertisement campaign controller 150 may select advertisements for sending to the user terminal 102 for display through the advertisement customization module 112 and/or may communicate a command to the advertisement customization module 112 to cause it to select among available advertisements for display by the user terminal 102.

The advertisement campaign controller 150 may collect user profile information reported from across all of the user terminals 102a-102n, and identify patterns among the user profile information which are used to control the marketing campaign of advertisements displayed by the user terminals 102a-102n.

Figure 3:
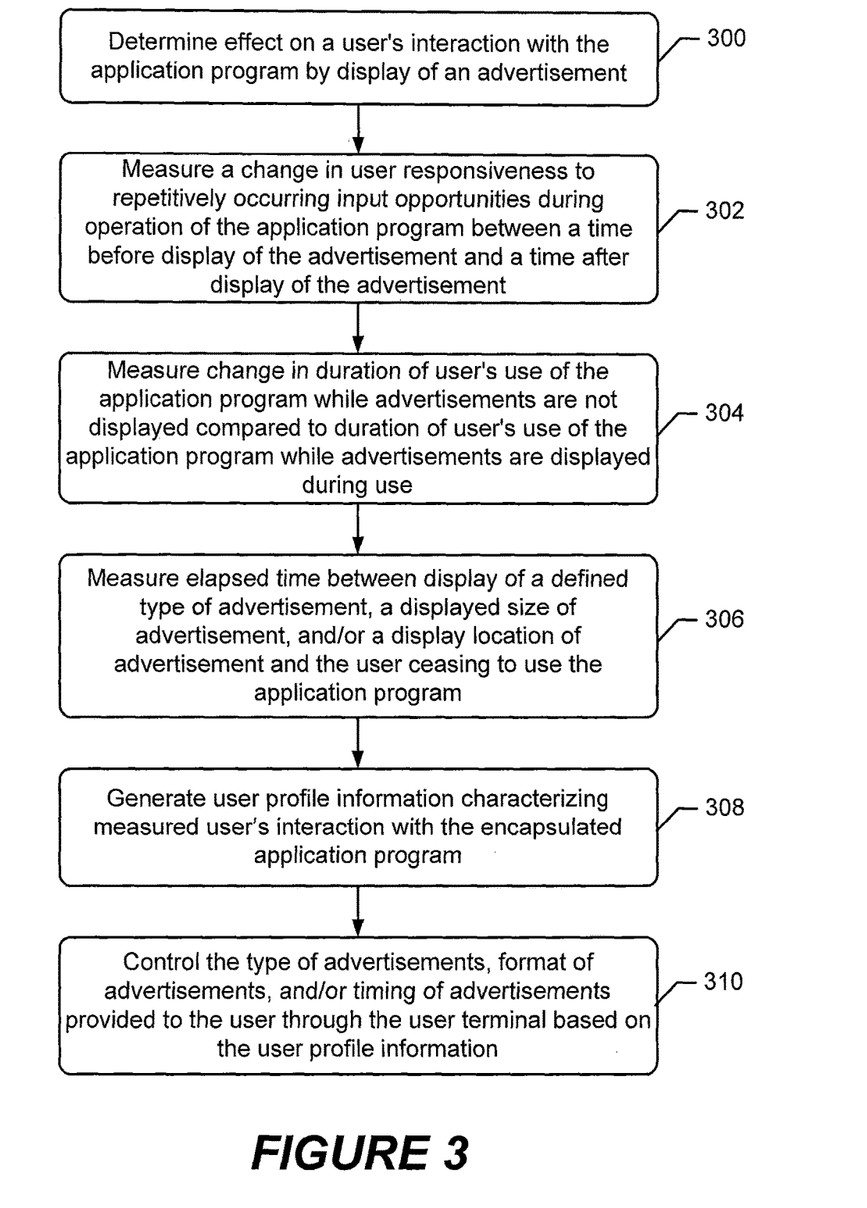
FIGS. 3-7 are flowcharts of operations that may be performed by a user terminal configured according to some embodiments of the present disclosure.

Referring to the operations illustrated in the flowchart of FIG. 3, the instrument encapsulation module 108 may generate (block 308) the user profile information, which characterizes measured user interaction with the application program, based on determining (block 300) an effect on a user's interaction with the application program by display of an advertisement on the user terminal 102. The user's interaction with the application program may be measured based on monitoring application programming interface calls by the application program 106 to determine the effect on the user's interaction with the application program by display of the advertisement.

The user profile information may be generated (block 308) based on measuring (block 302) a change in user responsiveness to repetitively occurring input opportunities during operation of the application program 106 between a time before display of the advertisement and a time after display of the advertisement. The user profile information may be generated based on measuring the user responsiveness based on elapsed time between sequential occurrences of a defined type of application programming interface call by the application program 106 to process user input. The instrument encapsulation module 108 may identify a type of advertisement, a displayed size of advertisement, and/or a display location of advertisement associated with the measured change in user responsiveness.

The user profile information may be generated (block 308) based on measuring (block 304) change in duration of user's use of the application program 106 while advertisements are not displayed compared to duration of user's use of the application program 106 while advertisements are displayed during use. The duration of the user's use of the application program may be measured based on elapsed time between occurrence of a defined type of application programming interface call proximate in time after start-up of the application program 106 and occurrence of another defined type of application programming interface call proximate in time before shut-down of the application program 106. The instrument encapsulation module 108 may identify a type of advertisement, a displayed size of advertisement, and/or a display location of advertisement associated with the measured change in duration of user's use of the application program.

The user profile information may be generated (block 308) based on measuring (block 306) elapsed time between display of a defined type of advertisement, a displayed size of advertisement, and/or a display location of advertisement and the user ceasing to use the application program 106.

Figure 4:
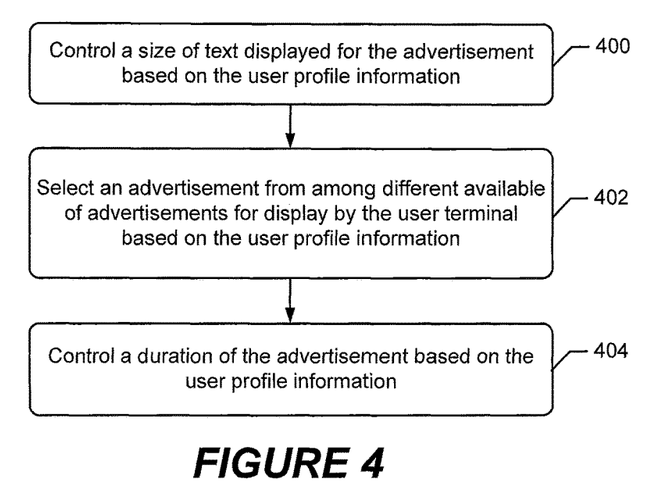

The advertisement customization controller 112 can control (block 310) the type of advertisements, format of advertisements, and/or timing of advertisements provided to the user through the user terminal 102 based on the user profile information. Referring to the operations illustrated in the flowchart of FIG. 4, the advertisement customization controller 112 may control (block 400) a size of text displayed for the advertisement based on the user profile information, may select (block 402) an advertisement from among different available of advertisements for display by the user terminal based on the user profile information, and/or may control (block 404) a duration of the advertisement based on the user profile information.

Figure 5:
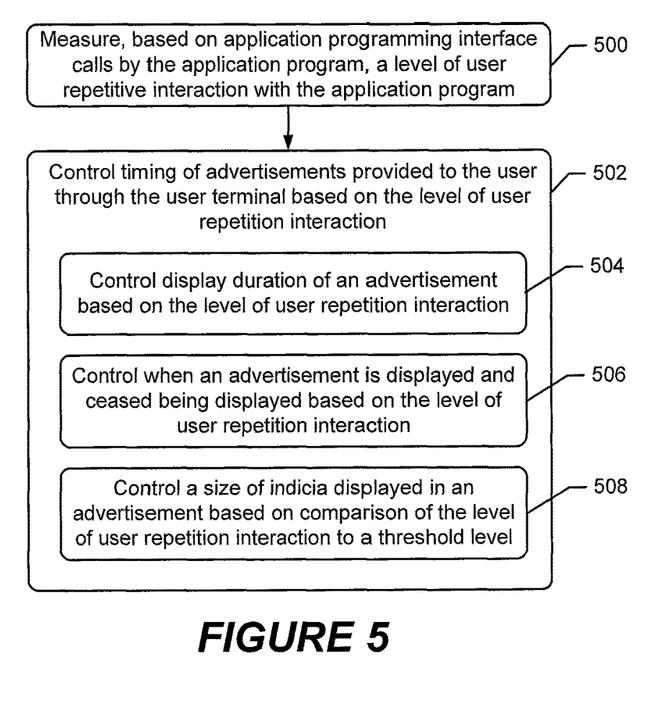

Referring to the operations illustrated in the flowchart of FIG. 5, the instrument encapsulation module 108 may measure (block 500), based on application programming interface calls by the application program 106, a level of user repetitive interaction with the application program 106. The advertisement customization controller 112 may control (block 502) timing of advertisements provided to the user through the user terminal 102 based on the level of user repetition interaction.

The timing of advertisements may be controlled by controlling (block 504) the duration of which advertisements are displayed by the user terminal 102 based on the level of user repetition interaction. For example, the advertisement customization controller 112 may increase a display duration of an advertisement based on the level of user repetition interaction being less than a threshold level, and decrease a display duration of an advertisement based on the level of user repetition interaction being greater than the threshold level.

The timing of advertisements may be controlled by controlling (block 506) when an advertisements displayed and ceased being displayed based on the level of user repetition interaction. For example, the advertisement customization controller 112 may initiate display of an advertisement based on the level of user repetition interaction being less than a threshold level, and cease display of the advertisement based on the level of user repetition interaction being greater than the threshold level.

The timing of advertisements may be controlled by controlling (block 508) a size of indicia displayed in an advertisement based on comparison of the level of user repetition interaction to a threshold level. For example, the size of indicia displayed an advertisement may be decreased based on the level of user repetition interaction being less than a threshold level which may indicate the user has more time to examine more detail displayed in an advertisement, and increased based on the level of user repetition interaction being greater than a threshold level which may indicate the user has less time to examine detail displayed in an advertisement.

Figure 6:
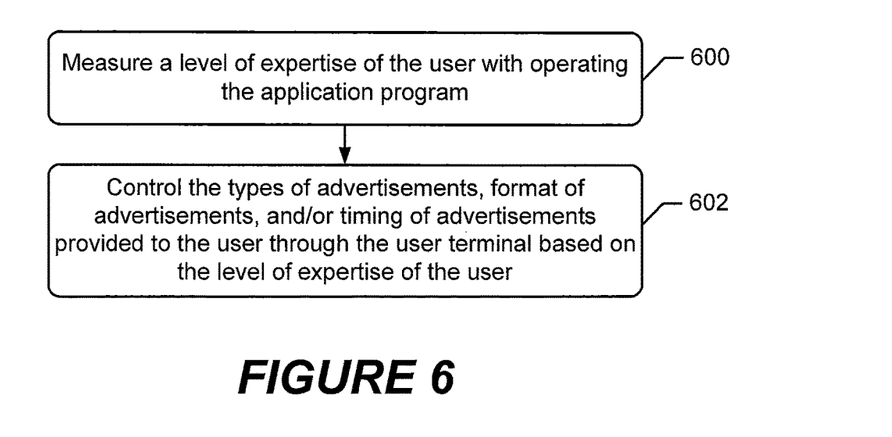

Referring to the operations illustrated in the flowchart of FIG. 6, the instrument encapsulation module 108 may generate the user profile information based on measuring (block 600) a level of expertise of the user with operating the application program 106. The advertisement customization controller 112 may then control (block 602) the types of advertisements, format of advertisements, and/or timing of advertisements provided to the user through the user terminal 102 based on the level of expertise of the user.

The instrument encapsulation module 108 may generate the user profile information based on measuring a level of persistence of the user to solving challenges provided by operation of the application program. The advertisement customization controller 112 may then control the types of advertisements, format of advertisements, and/or timing of advertisements provided to the user through the user terminal 102 based on the level of persistence of the user.

Figure 7:
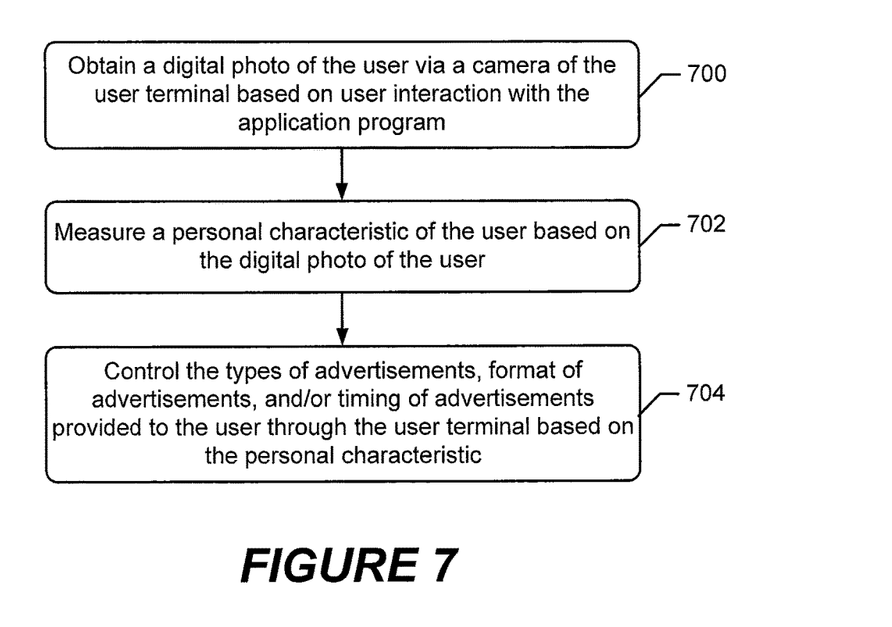

Referring to the operations illustrated in the flowchart of FIG. 7, the instrument encapsulation module 108 may generate the user profile information based on obtaining (block 700) a digital photo of the user via a camera of the user terminal 102 based on user interaction with the application program 106, and measuring (block 702) a personal characteristic of the user based on the digital photo of the user. The advertisement customization controller 112 may then control (block 704) the types of advertisements, format of advertisements, and/or timing of advertisements provided to the user through the user terminal 102 based on the personal characteristic.

In this manner advertisements can be customized based on observations of the user's behavior when using the application program. Such customization of advertisements may encourage increased frequency of use, duration of use, and user satisfaction with application programs processed by user terminals. This may provide a user terminal that operates more efficiently as application programs can display advertisements that are formatted and timed for presentation when they will have a greater likelihood of being viewed by a user, and operations for displaying the advertisements can be configured to reduce utilization of resources of the user terminal when the advertisements are predicted to have less likelihood of being viewed by a user.

Example User Terminal and Advertisement Campaign Computer

Figure 8:
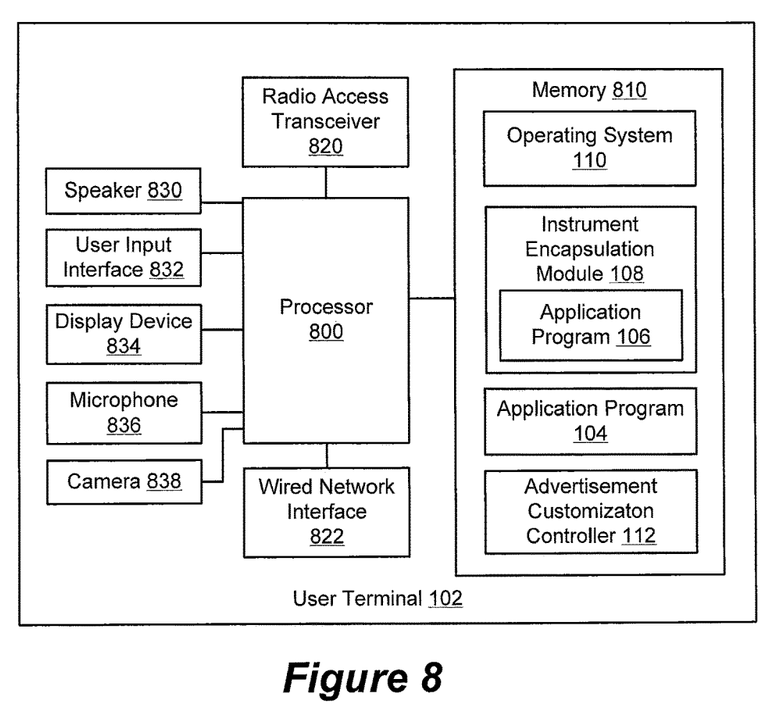
FIG. 8 is a block diagram of a user terminal configured according to some embodiments of the present disclosure.

FIG. 8 is a block diagram of a user terminal 102 configured according to some embodiments of the present disclosure. Referring to FIG. 11, the mobile terminal 102 includes a processor 800, a memory 810, and a network interface which may include a radio access transceiver 820 and/or a wired network interface 822 (e.g., Ethernet interface). The radio access transceiver 820 can include, but is not limited to, a LTE or other cellular transceiver, WLAN transceiver (IEEE 802.11), WiMax transceiver, or other radio communication transceiver configured to communicate with the advertisement campaign computer 150 via a radio access network.

The processor 800 may include one or more data processing circuits, such as a general purpose and/or special purpose processor, such as a microprocessor and/or digital signal processor. The processor 800 is configured to execute computer program code in the memory 810, described below as a non-transitory computer readable medium, to perform at least some of the operations described herein as being performed by a user terminal. The computer program code may include an operating system 110, a plurality of application programs 104 and 106, an instrument encapsulation module 108, and an advertisement customization controller 112. The computer program code when executed by the processor 800 causes the processor 800 to perform operations in accordance with one or more embodiments disclosed herein.

The instrument encapsulation module 108 may generate user profile information characterizing measured user interaction with an application program that is encapsulated by the instrument encapsulation module 108 and processed by the processor 800. The advertisement customization controller 112 may control, based on the user profile information, operation of an advertisement displayed while the application program 106 is being processed. The advertisement may be displayed on the display device 834 under operation of the application program 106 ("in-application advertisement"). For example, the application program 106 may display the advertisement within a same window of the display 834 in which information generated by the application program 106 is displayed.

The user terminal 102 may further include a speaker 830, user input interface 832 (e.g., touch screen, keyboard, keypad, etc.), a display device 834, a microphone 836, and a camera 838. As used herein, the term "user terminal" may include a cellular radiotelephone, satellite radiotelephone, a gaming console, a smart appliance, a tablet computer, a laptop computer, and/or a desktop computer.

Figure 9:
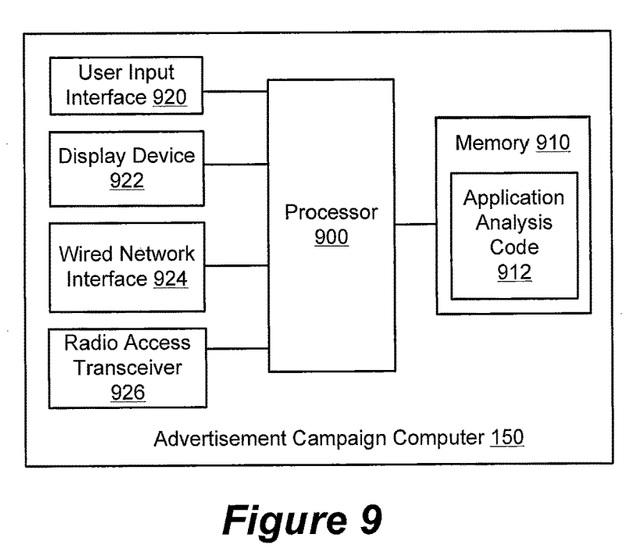
FIG. 9 is a block diagram of an advertisement campaign computer configured according to some embodiments of the present disclosure.

FIG. 9 is a block diagram of an advertisement campaign computer 150 configured according to some embodiments of the present disclosure. The advertisement campaign computer 150 includes a processor 900, a memory 910, and a network interface which may include a radio access transceiver 926 and/or a wired network interface 924 (e.g., Ethernet interface). The radio access transceiver 926 can include, but is not limited to, a LTE or other cellular transceiver, WLAN transceiver (IEEE 802.11), WiMax transceiver, or other radio communication transceiver configured to communicate with the user terminal 102 via a radio access network.

The processor 900 may include one or more data processing circuits, such as a general purpose and/or special purpose processor (e.g., microprocessor and/or digital signal processor) that may be collocated or distributed across one or more networks. The processor 900 is configured to execute computer program code in the memory 910, described below as a non-transitory computer readable medium, to perform at least some of the operations described herein as being performed by an application analysis computer. The computer program code may include application analysis code 912 that when executed by the processor 900 causes the processor 900 to perform operations in accordance with one or more embodiments disclosed herein for the advertisement campaign computer 150. The advertisement campaign computer 150 may further include a user input interface 920 (e.g., touch screen, keyboard, keypad, etc.) and a display device 922.

For example, the application analysis code 912 may receive user profile information from the user terminal 102 characterizing measured user interaction with the application program 106 processed by the user terminal 102, and control, based on the user profile information, a marketing campaign of advertisements displayed by the user terminal 102.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer program product, comprising:
    a non-transitory computer readable storage medium comprising computer readable program code embodied in the medium that when executed by a processor of a user terminal causes the processor to perform operations to increase frequency or duration of use of an application program by a user, the operations comprising:
    measuring a change in user responsiveness to repetitively occurring input opportunities during operation of the application program;
    generating user profile information of the user characterizing the measured change in user responsiveness to the repetitively occurring input opportunities during operation of the application program that is encapsulated by the computer readable program code and processed by the processor;
    determining an effect on continued measurements of change in user responsiveness to the repetitively occurring input opportunities during operation of the application program by display of an advertisement while the application program is being processed;
    updating the user profile information of the user based on the effect on the continued measurements of change in user responsiveness to the repetitively occurring input opportunities during operation of the application program by display of the advertisement;
    transmitting, through a network, the updated user profile information of the user to an advertisement campaign computer;
    receiving, from the advertisement campaign computer via the network, a message indicating which advertisements are to be selected for display to the user while the application program is being processed; and
    responsive to the continued measurements of change in user responsiveness being below the threshold level, controlling timing of display of one of a video-based advertisement and a non-video based advertisement that has been selected for display to the user while the application program is being processed.

2. The computer program product of claim 1, wherein the determining effect on the user's interaction with the application program by display of the advertisement, comprises:
    monitoring application programming interface calls by the application program to determine the effect on the user's interaction with the application program by display of the advertisement.

3. The computer program product of claim 1, wherein the determining effect on the user's interaction with the application program by display of an advertisement, comprises:
    measuring the change in user responsiveness to the repetitively occurring input opportunities during operation of the application program between a time before display of the advertisement and a time after display of the advertisement.

4. The computer program product of claim 3, wherein the measuring the change in user responsiveness to the repetitively occurring input opportunities during operation of the application program between the time before display of the advertisement and the time after display of the advertisement, comprises:
    measuring the user responsiveness based on elapsed time between sequential occurrences of a defined type of application programming interface call by the application program to process user input.

5. The computer program product of claim 3, wherein the determining effect on the user's interaction with the application program by display of an advertisement, further comprises:
    identifying a type of advertisement, a displayed size of advertisement, and/or a display location of advertisement associated with the measured change in user responsiveness.

6. The computer program product of claim 1, wherein the determining effect on the user's interaction with the application program by display of the advertisement, comprises:
    measuring change in duration of user's use of the application program while advertisements are not displayed compared to duration of user's use of the application program while advertisements are displayed during use.

7. The computer program product of claim 6, wherein the measure change in duration of user's use of the application program while advertisements are not displayed compared to duration of user's use of the application program while advertisements are displayed during use, comprises:
    measuring the duration of the user's use of the application program based on elapsed time between occurrence of a defined type of application programming interface call proximate in time after start-up of the application program and occurrence of another defined type of application programming interface call proximate in time before shut-down of the application program.

8. The computer program product of claim 6, wherein the determining effect on the user's interaction with the application program by display of an advertisement, further comprises:
    identifying a type of advertisement, a displayed size of advertisement, and/or a display location of advertisement associated with the measured change in duration of user's use of the application program.

9. The computer program product of claim 1, wherein the determining effect on the user's interaction with the application program by display of the advertisement, comprises:
measuring elapsed time between display of a defined type of advertisement, a displayed size of advertisement, and/or a display location of advertisement and the user ceasing to use the application program.

10. The computer program product of claim 1, wherein the controlling, based on the user profile information, operation of the advertisement displayed while the application program is being processed, comprises:
controlling the type of advertisements, format of advertisements, and/or timing of advertisements provided to the user through the user terminal based on the user profile information.

11. The computer program product of claim 10, wherein the controlling the type of advertisements, format of advertisements, and/or timing of advertisements provided to the user through the user terminal based on the user profile information, comprises:
controlling a size of text displayed for the advertisement based on the user profile information.

12. The computer program product of claim 10, wherein the controlling the type of advertisements, format of advertisements, and/or timing of advertisements provided to the user through the user terminal based on the user profile information, comprises:
selecting an advertisement from among different available of advertisements for display by the user terminal based on the user profile information.

13. The computer program product of claim 10, wherein the controlling the type of advertisements, format of advertisements, and/or timing of advertisements provided to the user through the user terminal based on the user profile information, comprises:
controlling a duration of the advertisement based on the user profile information.

14. The computer program product of claim 1, wherein:
the generating user profile information characterizing measured user interaction with the application program that is encapsulated by the computer readable program code and processed by the processor, comprises:
measuring, based on application programming interface calls by the application program, a level of user repetitive interaction with the application program; and
the controlling, based on the user profile information, operation of an advertisement displayed while the application program is being processed, comprises:
controlling timing of advertisements provided to the user through the user terminal based on the level of user repetition interaction.

15. The computer program product of claim 14, wherein the controlling timing of advertisements provided to the user through the user terminal based on the level of user repetition interaction, comprises:
increasing a display duration of an advertisement based on the level of user repetition interaction being less than a repetition threshold level; and
decreasing a display duration of an advertisement based on the level of user repetition interaction being greater than the repetition threshold level.

16. The computer program product of claim 14, wherein the controlling timing of advertisements provided to the user through the user terminal based on the level of user repetition interaction, comprises:
initiating display of an advertisement based on the level of user repetition interaction being less than a repetition threshold level, and ceasing display of the advertisement based on the level of user repetition interaction being greater than the repetition threshold level.

17. The computer program product of claim 14, wherein the controlling timing of advertisements provided to the user through the user terminal based on the level of user repetition interaction, comprises:
controlling a size of indicia displayed in an advertisement based on comparison of the level of user repetition interaction to a repetition threshold level.

18. The computer program product of claim 14, wherein:
the generating user profile information characterizing measured user interaction with the application program that is encapsulated by the computer readable program code and processed by the processor, comprises:
measuring a level of expertise of the user with operating the application program; and
the controlling, based on the user profile information, operation of an advertisement displayed while the application program is being processed, comprises:
controlling the types of advertisements, format of advertisements, and/or timing of advertisements provided to the user through the user terminal based on the level of expertise of the user.

19. The computer program product of claim 1, wherein:
the generating user profile information characterizing measured user interaction with the application program that is encapsulated by the computer readable program code and processed by the processor, comprises:
measuring a level of persistence of the user to solving challenges provided by operation of the application program; and
the controlling, based on the user profile information, operation of an advertisement displayed while the application program is being processed, comprises:
controlling the types of advertisements, format of advertisements, and/or timing of advertisements provided to the user through the user terminal based on the level of persistence of the user.

20. The computer program product of claim 1, wherein:
the generating user profile information characterizing measured user interaction with the application program that is encapsulated by the computer readable program code and processed by the processor, comprises:
obtaining a digital photo of the user via a camera of the user terminal based on user interaction with the application program; and
measuring a personal characteristic of the user based on the digital photo of the user; and
the controlling, based on the user profile information, operation of an advertisement displayed while the application program is being processed, comprises:
controlling the types of advertisements, format of advertisements, and/or timing of advertisements provided to the user through the user terminal based on the personal characteristic.

21. The computer program product of claim 1 having further program code embodied in the medium that when executed by the processor of the user terminal causes the processor to perform further operations comprising:
responsive to the continued measurements of change in user responsiveness being above the threshold level, controlling timing of display of the other one of the video-based advertisement and the non-video based advertisement for display while the application program is being processed.

22. A computer program product, comprising:
a non-transitory computer readable storage medium comprising computer readable program code embodied in the medium that when executed by a processor of an advertisement campaign computer causes the processor to perform operations to increase one of frequency and duration of use of an application program by a user, the operations comprising:
- receiving user profile information of the user from a user terminal characterizing measured change in user responsiveness to repetitively occurring input opportunities during operation of the application program processed by the user terminal;
- controlling, based on the user profile information of the user, a marketing campaign of advertisements displayed by the user terminal;
- determining an effect on continued measurements of change in user responsiveness to the repetitively occurring input opportunities during operation of the application program by display of an advertisement;
- updating the user profile information of the user based on the effect on the continued measurements of change in user responsiveness to the repetitively occurring input opportunities during operation of the application program by display of the advertisement; and
- send, to the user terminal, a message indicating which advertisements to display to the user while the application is being processed based on the updated user profile information of the user, wherein one of a video-based advertisement of the advertisements and a non-video based advertisement of the advertisements is to be displayed to the user responsive to the continued measurement of change in user responsiveness being below the threshold level.

* * * * *